United States Patent
Nobuchi et al.

(10) Patent No.: US 6,492,974 B1
(45) Date of Patent: *Dec. 10, 2002

(54) SMALL-SIZED PORTABLE INFORMATION PROCESSING APPARATUS

(75) Inventors: Atsunobu Nobuchi, Kawasaki (JP); Hideaki Kamikakoi, Kawasaki (JP); Katsuichi Gotou, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,184

(22) Filed: Apr. 8, 1997

(30) Foreign Application Priority Data

Oct. 8, 1996 (JP) .............................................. 8-267235

(51) Int. Cl.⁷ .................................................. G09G 5/08
(52) U.S. Cl. ........................ 345/156; 345/168; 345/173
(58) Field of Search ................................. 345/104, 156, 345/168, 173, 901

(56) References Cited

U.S. PATENT DOCUMENTS

| | | | |
|---|---|---|---|
| 4,825,395 A | 4/1989 | Kinser, Jr. et al. | |
| 4,842,531 A | 6/1989 | Takemura | 439/165 |
| 4,846,536 A | 7/1989 | Saitou et al. | 312/72 |
| 4,878,293 A | 11/1989 | Kinser, Jr. et al. | |
| 4,885,430 A | 12/1989 | Kinser, Jr. et al. | |
| 4,899,137 A | 2/1990 | Behrens et al. | 340/711 |
| 4,918,632 A | 4/1990 | York | 364/708 |
| 4,960,256 A | 10/1990 | Chihara et al. | 248/284 |
| 4,961,126 A | 10/1990 | Suzuki | 361/398 |

(List continued on next page.)

FOREIGN PATENT DOCUMENTS

| | | |
|---|---|---|
| DE | 4228605 | 3/1994 |
| DE | 19618325 | 4/1997 |
| DE | 29701721 | 5/1997 |
| EP | 0 248 156 | 12/1987 |
| EP | 0 454 120 | 10/1991 |
| EP | 0 458 316 | 11/1991 |
| EP | 0 604 069 | 6/1994 |
| EP | 0 643 348 | 3/1995 |
| GB | 2 283 531 | 5/1995 |
| GB | 2 305 689 | 4/1997 |
| JP | 62-6298 | 1/1987 |
| JP | 62-17786 | 1/1987 |
| JP | 62-006298 | 1/1987 |
| JP | 62-017786 | 1/1987 |
| JP | 2-76775 | 6/1990 |
| JP | 4-25926 | 1/1992 |
| JP | 4-25928 | 1/1992 |
| JP | 4-43420 | 2/1992 |
| JP | 4-109330 | 4/1992 |
| JP | 4-315250 | 11/1992 |
| JP | 5-173668 | 7/1993 |
| JP | 5-242040 | 9/1993 |
| JP | 5-289774 | 11/1993 |
| JP | 7-006136 | 1/1995 |
| JP | 8-22343 | 1/1996 |
| JP | 9-130058 | 5/1997 |
| WO | 91/05327 | 4/1991 |
| WO | 93/01700 | 1/1993 |
| WO | 95/00406 | 1/1995 |

OTHER PUBLICATIONS

*HP OMNIGO 100, Quick Start and User's Reference Guide,* Sep. 1995, Particularly see p. 2–1.

Primary Examiner—Amare Mengistu
(74) Attorney, Agent, or Firm—Staas & Halsey LLP

(57) ABSTRACT

An information processing apparatus includes a body having a display panel pivotally attached to the body, the panel having a plural, selectable data display orientations. A detector detects a size of an angle between the display panel and the body and a selector selects a corresponding one of the data display orientations in accordance with the size of the detected angle, affording automatic change of the data display orientations in accordance with respective, different desired configurations of the apparatus.

28 Claims, 14 Drawing Sheets

U.S. PATENT DOCUMENTS

| | | |
|---|---|---|
| 4,976,007 A | 12/1990 | Lam .............................. 16/302 |
| 5,077,551 A | 12/1991 | Saitou ......................... 340/700 |
| 5,109,354 A | 4/1992 | Yamashita et al. ........... 364/708 |
| 5,128,829 A | 7/1992 | Loew ........................... 361/380 |
| 5,235,532 A | 8/1993 | Sugino ........................ 364/707 |
| 5,268,817 A | 12/1993 | Miyagawa et al. .......... 361/729 |
| 5,278,725 A | 1/1994 | Konno et al. |
| 5,282,293 A | 2/1994 | Pedoeem ...................... 16/342 |
| 5,359,550 A | 10/1994 | Chen ......................... 364/708.1 |
| 5,375,076 A | 12/1994 | Goodrich et al. ......... 364/708.1 |
| 5,410,447 A | 4/1995 | Miyagawa et al. .......... 361/681 |
| 5,436,792 A | 7/1995 | Leman et al. ................ 361/686 |
| 5,481,430 A | 1/1996 | Miyagawa et al. .......... 361/681 |
| 5,555,157 A | 9/1996 | Moller et al. ................ 361/683 |
| 5,594,619 A | 1/1997 | Miyagawa et al. .......... 361/681 |
| 5,644,516 A | 7/1997 | Podwalny et al. ........ 364/708.1 |
| 5,666,694 A | 9/1997 | Slow et al. .................... 16/368 |
| 5,719,799 A | 2/1998 | Isashi |
| 5,898,600 A * | 4/1999 | Isahshi ........................ 348/552 |
| 5,936,619 A * | 8/1999 | Nagasaki et al. ............ 345/205 |

\* cited by examiner

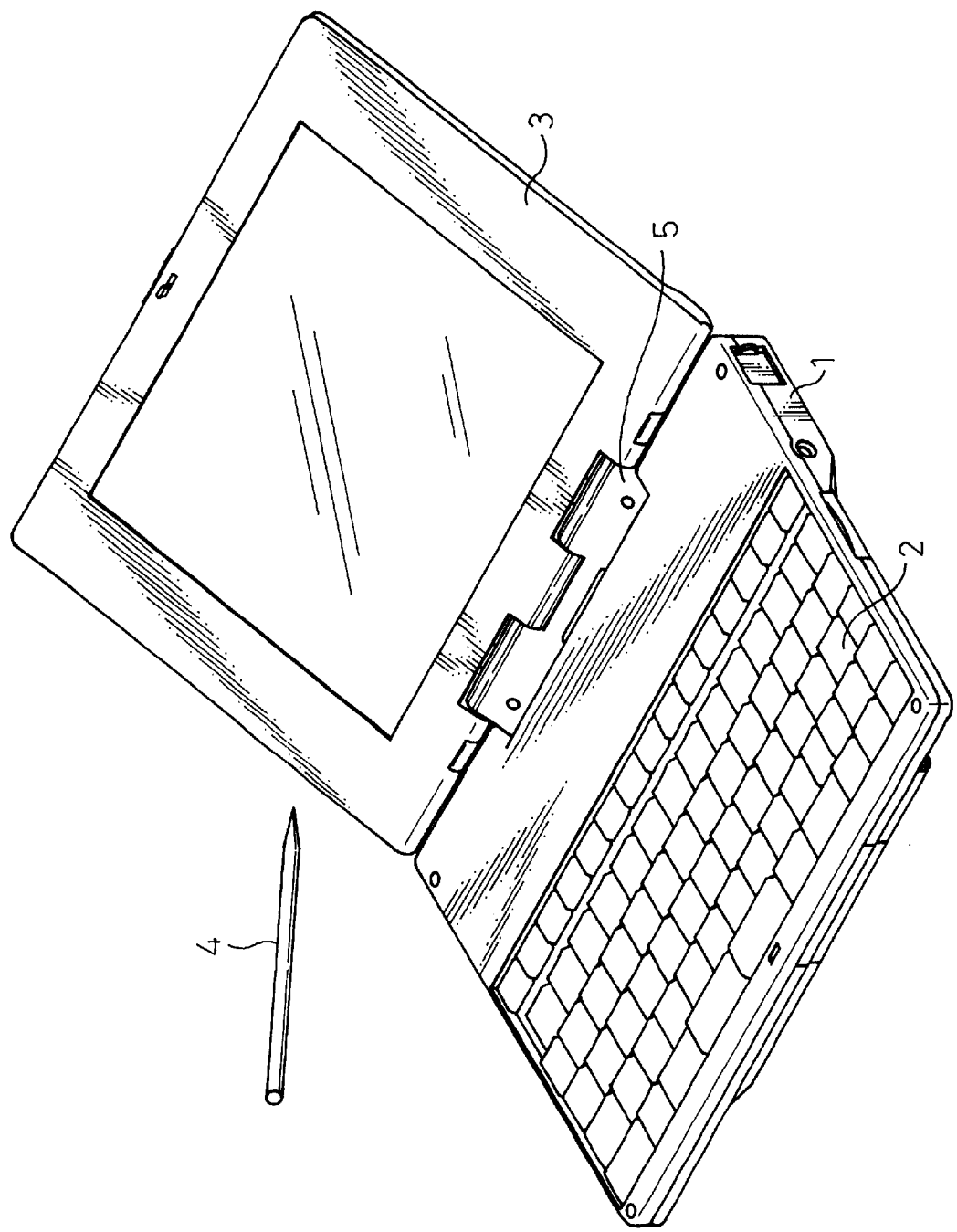

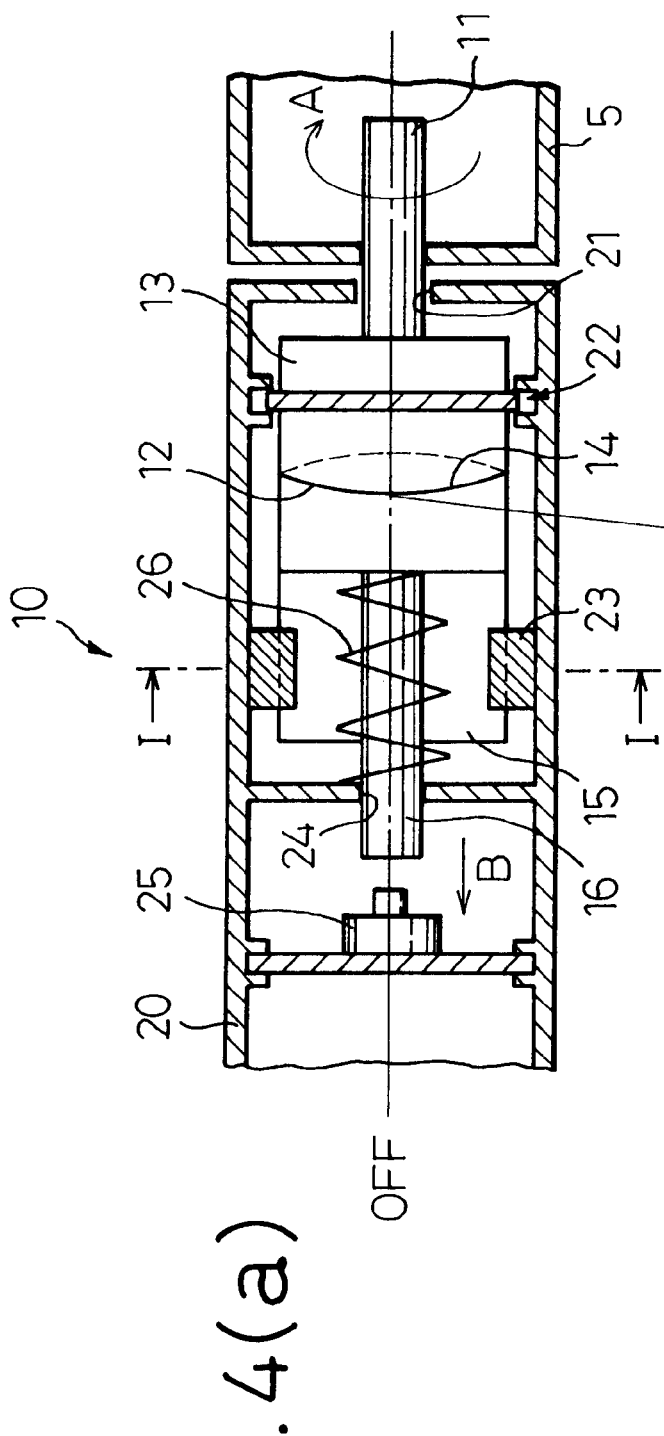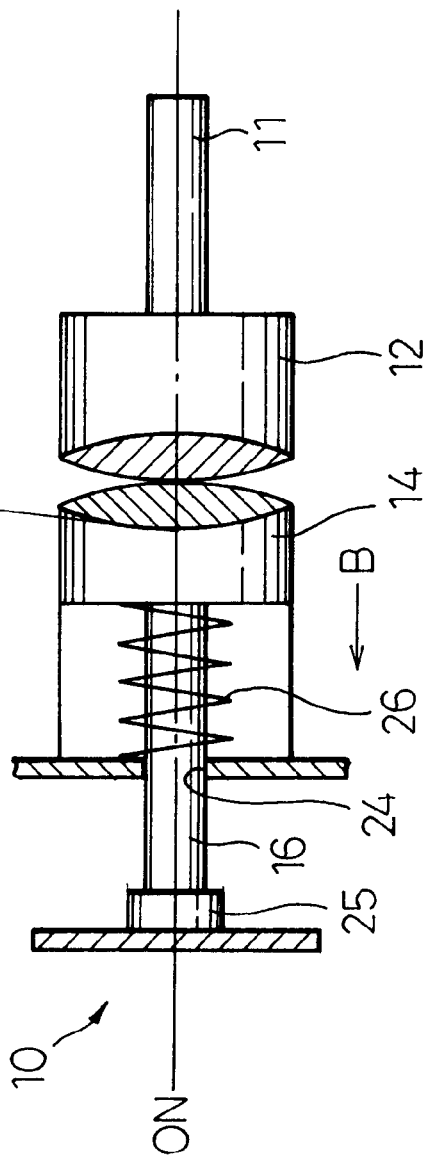
Fig.4(a)
Fig.4(b)

I-I SECTION

ON-OFF

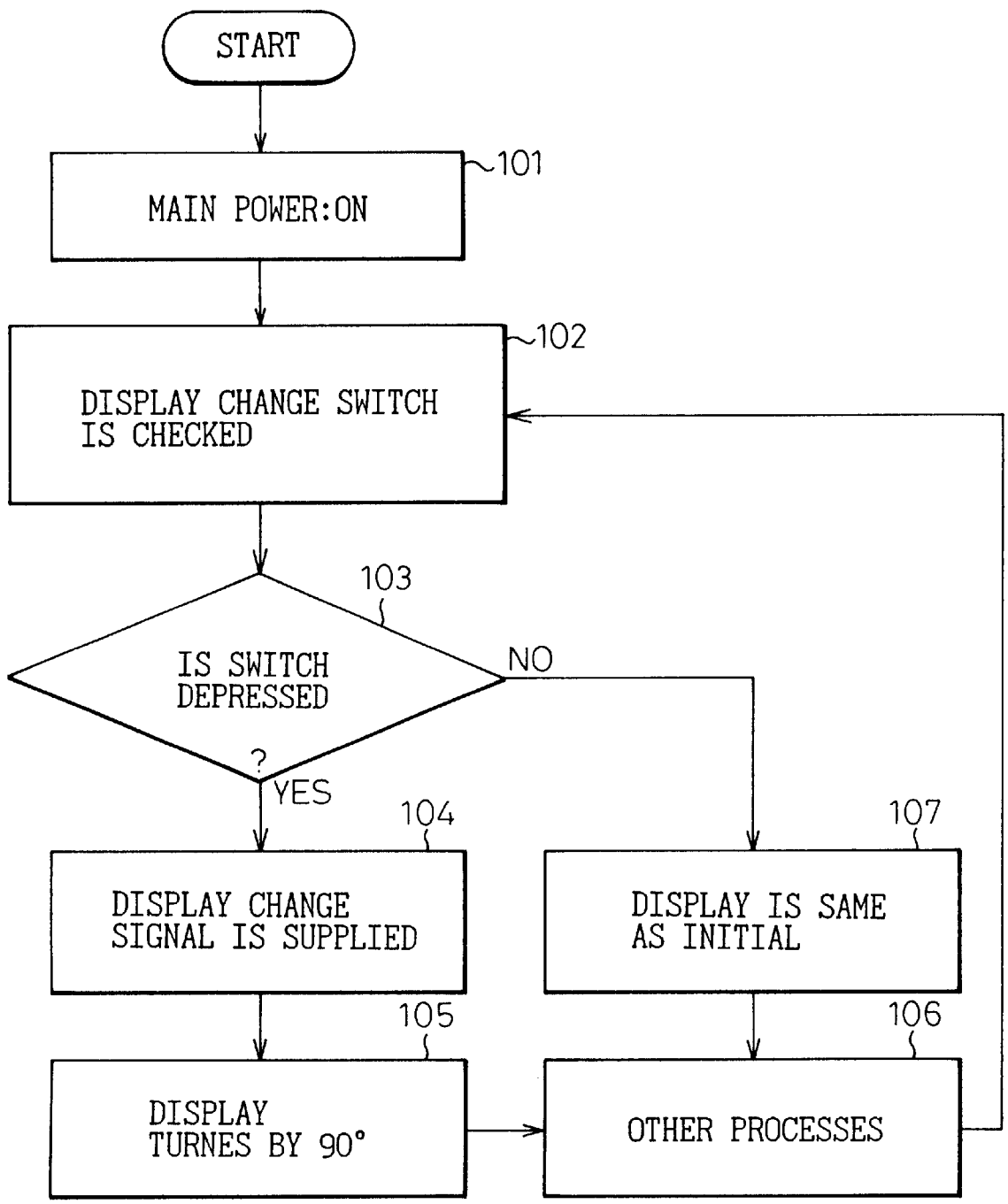

US 6,492,974 B1

SMALL-SIZED PORTABLE INFORMATION PROCESSING APPARATUS

BACKGROUND OF THE INVENTION

1. Field of the Invention

The present invention relates to a small-sized portable information processing apparatus. More particularly, this invention relates to a small-sized portable information processing apparatus, such as a portable calculation machine, a portable computer, a portable word processor, an electronics note book or the like, having an information indication display, such as a liquid crystal display, or the like.

2. Description of the Related Art

It is required that a small-sized portable information processing apparatus be easily operated with a pen or the like operating element as well as being small-sized, lightweight, and easily portable. Therefore, an apparatus body, i.e., a housing, or case, is provided with a keyboard integral therewith. A liquid crystal display, which functions as a touch input panel, is pivotably attached to the apparatus body by means of a hinge, so that the liquid crystal display can be pivotably moved by approximately 360° with respect to the apparatus body. In such an apparatus, it is possible to input through the keyboard while watching the display and also possible to directly input to the liquid crystal display through a pen or the like after the liquid crystal display is pivotally moved (i.e., rotated) by 360° with respect to a closed position relatively to the apparatus body.

FIGS. 16(a) and 16(b) are perspective views of such a portable apparatus known in the prior art, in which FIG. 16(a) shows the liquid crystal display opened to an obtuse angle position, relatively to the closed position with respect to the apparatus body so that the keyboard can be operated and FIG. 16(b) shows that the liquid crystal display is pivotably moved by 360° with respect to the closed position thereof so that the liquid crystal display can face upwards to allow direct input thereto by a pan or the like. As shown in these drawings, the apparatus comprises an apparatus body 1, a keyboard 2 integrally provided on the top of the apparatus body, a liquid crystal display 3 having its display surface as a touch panel and a hinge member 5 having two pivot shafts 5a and 5b.

As shown in these drawings, the liquid crystal display 3 is connected to the apparatus body 1 by means of the hinge member 5 having two pivot shafts 5a and 5b. More particularly, the rear edge of the liquid crystal display 3 is connected to one pivot shaft 5a of the hinge member 5 and the other pivot shaft 5b is connected to the rear edge of the apparatus body 1.

As shown in FIG. 16(a), when the liquid crystal display 3 is rotated to a predetermined angle (an obtuse angle) with respect to the keyboard 2, it is possible to input through the keyboard while watching the display. Also, as shown in FIG. 16(b), it is also possible to pivotably move the liquid crystal display by 360° with respect to the apparatus body 1 from its closed position so that information can be directly input through the pen 4 to the liquid crystal display 3 which functions as a touch panel.

The liquid crystal display 4 is substantially rectangular in shape. Therefore, in a state of FIG. 16(a), it is preferable to set the apparatus so that the operator can input through the keyboard 2 while watching the liquid crystal display 3. On the contrary, in a state of FIG. 16(b), it is preferable to set the apparatus so that the operator can input through the liquid crystal display 3 using a pen 4 or the like.

Therefore, as shown in FIGS. 17(a) and 17(b), a display changing actuation position 17 is conventionally provided in the liquid crystal display 3 so that, when the operator touches this position with a tip of the pen 4, the orientation of the liquid crystal display 3 is turned by 90°. If the position is touched again, the orientation of the liquid crystal display 3 is turned back to the initial state.

Another actuation position for keyboard lock or operation invalidation is also provided in the liquid crystal display 3 so that, when the operator touches this actuation position with the pen 4, the function of the keyboard is locked or all or part of the operations are invalidated. If this actuation position is touched again, the keyboard lock or operation invalidation is released.

In this known portable information processing apparatus, the operator must use a pen 4 to touch the display changing position 17 every time the operator intends to change the liquid crystal display 3. Also, the operator must use the pen 4 to touch the display changing position 17 to change the display back to the initial state. Such an operation necessarily is somewhat troublesome.

Unexamined Patent Publications (Kokai) Nos. 62-6295 and 62-17786 suggest a small-sized image display apparatus in which a matrix panel (liquid crystal display) is rotatable by 360° with respect to the apparatus body and the panel is changed to either light transmitting type or light reflecting type in accordance with the luminous intensity exerted on the matrix panel.

In these prior art, although the matrix panel is automatically changed to either light transmitting type or light reflecting type in accordance with the luminous intensity exerted on the panel, this image display changing apparatus is not of a type in which the display is automatically changed in accordance with the state of use.

SUMMARY OF THE INVENTION

Accordingly, an object of the present invention is to provide a small-sized portable information processing apparatus, in which the liquid crystal display can automatically be changed without using a pen or the like, but by only rotating the liquid crystal display with respect to the apparatus body so as to change its state of use.

Another object of the present invention is to provide a small-sized portable information processing apparatus, in which the function of the keyboard is locked or all or a part of the operations are automatically invalidated, by rotating the liquid crystal display with respect to the apparatus body so as to change its state of use.

According to the present invention, there is provided a small-sized portable information processing apparatus comprising: an apparatus body; a display panel pivotably attached to the apparatus body, the display panel having a plurality of data display orientations therein; detecting means for detecting an angle between the apparatus body and the display; and changing means for selecting one of the orientations of the display panel in accordance with a result from the detecting means. Thus, the orientation of the display can be easily and automatically changed by only pivotably moving the liquid crystal display panel.

The display panel is pivotably movable by up to approximately 360° with respect to the apparatus body by means of a pivot shaft provided therebetween and a to switch performs an ON-OFF operation thereof in accordance with relative rotation between the display panel and the apparatus body about the pivot shaft. Thus, the orientation of the display can be easily and automatically changed by a switch ON-OFF operation.

The switching means is arranged to perform the ON-OFF operation thereof at a position near to the position achieved when the display has moved approximately 360° from a closed position thereof with respect to the apparatus body. Thus, the orientation of the display can be automatically changed when the apparatus is set so that only the display is to be operated.

The switching means comprises a cam provided on one of two members which move relatively about the pivot shaft and a cam follower which is provided on the other member so as to always be in contact with the cam and is axially moved in accordance with the rotation of the cam, so that the switching means performs ON-OFF operation thereof in accordance with the axial movement of the cam follower.

In an alternative embodiment, the switching means comprises a cam provided on one of two members which move relatively about the pivot shaft and a cam follower is provided on the other member so as to always be in contact with the cam and to be axially moved in accordance with the rotation of the cam, one of the cam and the cam follower having a concave shape and the other having a convex shape so that, after the cam follower moves in the axial direction and once comes into contact with a switching element, the concave and the convex shapes are mutually engaged with each other and therefore the cam follower moves away from the switching element.

The switching means comprises a projection provided on one of two members which move relatively about the pivot shaft and a sensor switch is provided on the other member so as to perform ON-OFF operation thereof in accordance with the rotational movement of the projection.

The sensor switch may be a type of switch which magnetically detects a position in the rotational movement of the display with respect to the apparatus body.

The sensor switch may be a type of switch which optically detects a position in the rotational movement of the display with respect to the apparatus body.

Since there is no mechanical switch means, a switch having few structural or movable parts can be obtained.

The display comprises a liquid crystal touch panel which has a function of displaying letters, images and the others, and a function of inputting information by touching thereon. Thus, an input operation can be effected from either the touch panel or the keyboard.

The apparatus body comprises a keyboard integrally incorporated therein and a means for locking or invalidating operation of the keyboard in accordance with a relative rotational movement of the display with respect to the apparatus body. Since the keyboard lock or the invalidation of keyboard operation is effected, when the state of use is changed, any accidental input errors through the keyboard can be prevented in advance.

BRIEF DESCRIPTION OF THE DRAWINGS

FIGS. 4(*a*) and 4(*b*) are cross-sectional views of the display changing means according to the first embodiment of this invention with the switching means being turned off and on, respectively;

FIG. 7 is a flow-chart showing an operation of the first embodiment;

FIGS. 11(*a*) and 11(*b*) correspond to FIGS. 9(*a*) and 9(*b*), respectively, but the angle between the liquid crystal display and the apparatus body is changed;

DETAILED DESCRIPTION OF THE EMBODIMENTS

Figure 2:
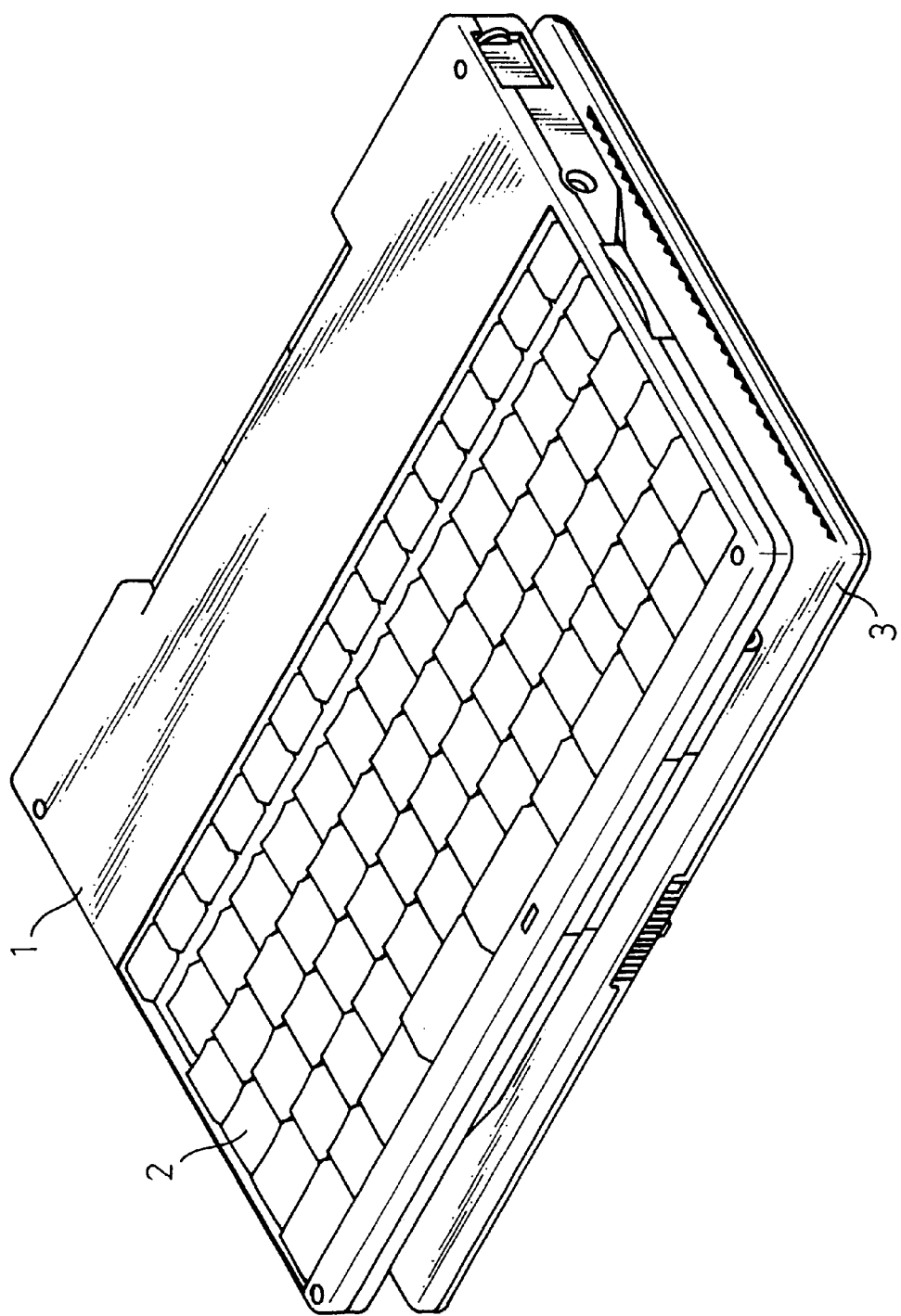
FIG. 2 is a perspective view of the first embodiment, but wherein the liquid crystal display is pivotably moved by 360° from the state of FIG. 1.
Figure 1A:
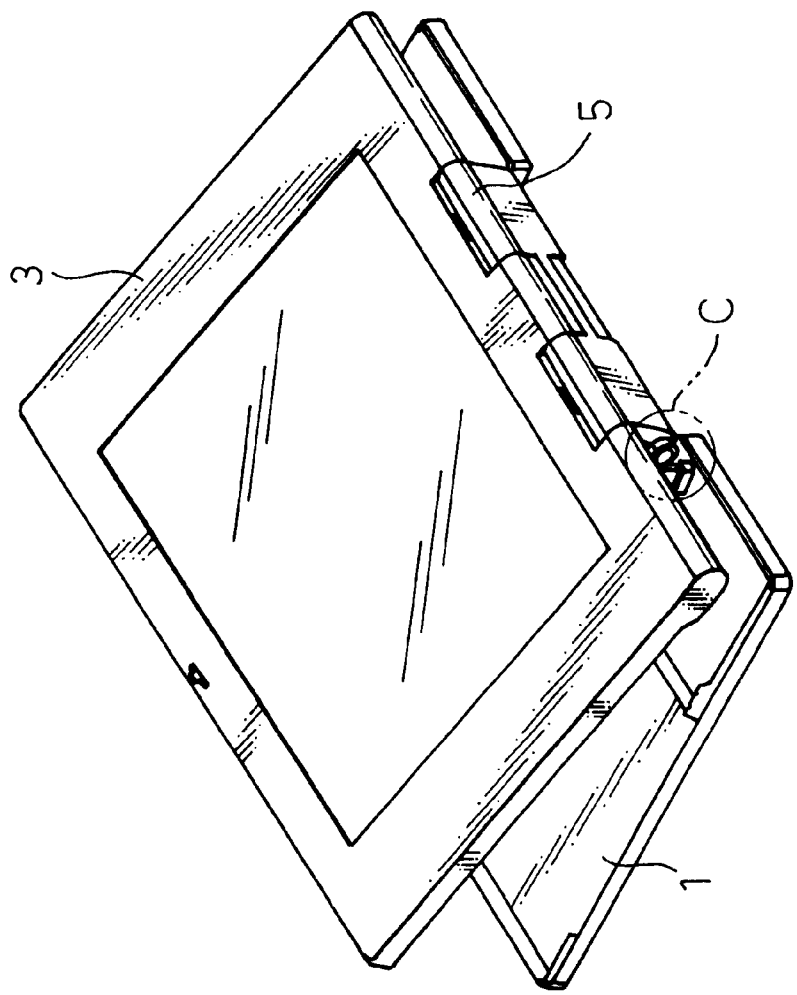
FIG. 1 is a perspective view of a first embodiment of the apparatus of this invention with the liquid crystal display in an opened state, or condition.
Figure 1B:
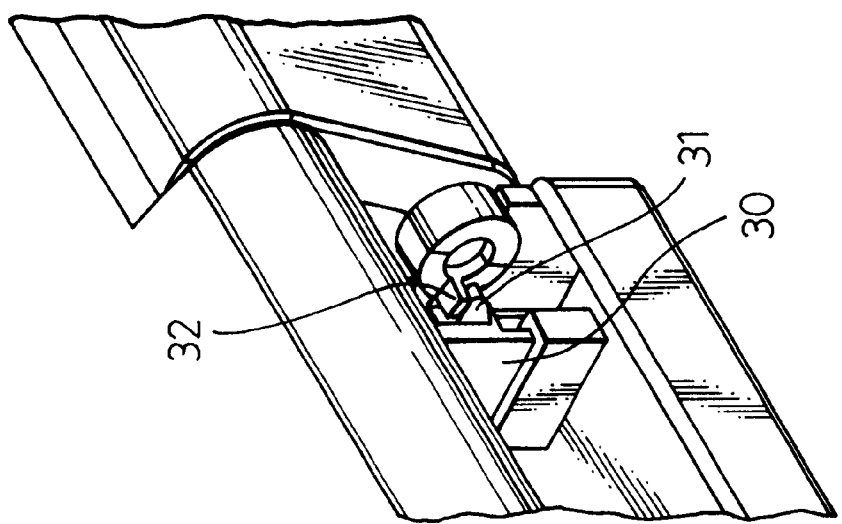

In the drawings, FIGS. 1 through 7 show a first embodiment of a small-sized portable information processing apparatus according to the present invention. FIGS. 1 and 2 are perspective views generally illustrating the first embodiment, in which FIG. 1 shows the embodiment with the crystal display panel opened so that a keyboard can be operated and FIG. 2 shows the same embodiment with the crystal display panel closed by pivotably moving the crystal display panel by 360° from a closed position so that any information can be input to the crystal display by a pen. As shown in these drawings, this embodiment includes a body (i.e., a case, or housing) 10 of the apparatus, a keyboard 2 provided on the top of the apparatus body, a touch-panel type crystal display 3 which also serves as a cover of the apparatus, a pen 4, and a hinge member 5 having two pivot shafts 5*a* and 5*b*.

The liquid crystal display 3 is connected to the apparatus body 1 by means of two pivot shafts 5*a* and 5*b*. Particularly, the hinge member 5 has a first pivot shaft 5*a* which is connected to the rear edge of the liquid crystal display 3 and a second pivot shaft 5*b* which is connected to the rear edge of the apparatus body 1.

As shown in FIG. 1, when the liquid crystal display 3 is in a position at a predetermined angle with respect to the key board 2, an operator can perform an input operation through the key board 2 while watching the liquid crystal display panel 3. Also, as shown in FIG. 2, when the liquid crystal display panel 3 is in a position after being turned by approximately 360° from the closed position relatively to the apparatus body 1 so that the back of the liquid crystal display panel comes into contact with the back of the apparatus body 1, the operator can perform an input operation directly through the liquid crystal display 3, as a touch panel, using a pen 4. (In FIG. 2, the liquid crystal display touch panel is on the back side of the keyboard 2.)

The liquid crystal display 3 is substantially rectangular in shape. Therefore, it is preferable to place the apparatus as shown in FIG. 1, so that the operator can operate the key board 2 with his fingers while watching the liquid crystal display 3 and, on the other hand, it is preferable to place the apparatus as shown in FIG. 2, so that the operator can operate the liquid crystal display 3 with the pen or the like.

Figure 3A:
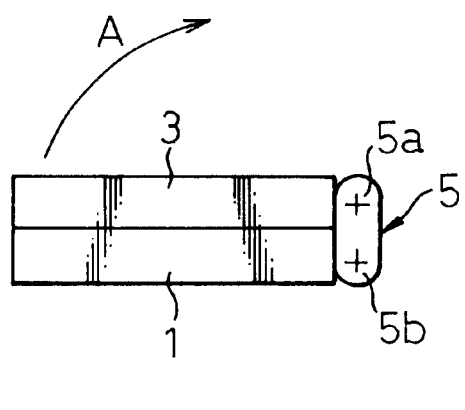
FIGS. 3(*a*) and 3(*b*) are schematic views showing a non-operable state in which the liquid crystal display is in a closed state with respect to the apparatus body and a pen operable state in which the liquid crystal display is pivotably moved by 360° relatively to the closed state of FIG. 3(*a*), respectively.
Figure 3B:
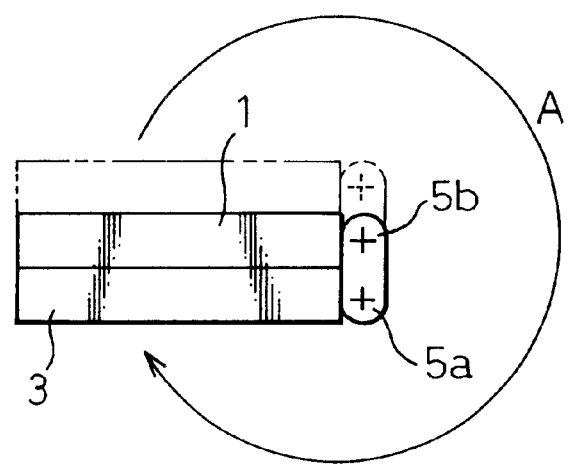
Figure 5:
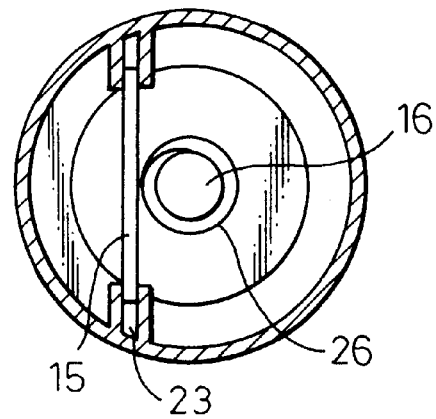
FIG. 5 is a cross-sectional view taken along line I—I in FIG. 4.

FIGS. 3(a) and 3(b) are illustrations explaining the turning, or rotation, of the liquid crystal display panel 3 with respect to the apparatus body 1 by 360° by approximately means of the hinge member 5 having two pivot shafts 5a and 5b, as shown by an arrow from a first position where the liquid crystal display panel 3 is close (i.e., is contiguous) to the apparatus body 1, to a second position, where the operator can operate the liquid crystal display 3 by a pen. As can be seen from these drawings, while the liquid crystal display 3 is turned with respect to the apparatus body 1 by 360°, the respective pivot shafts 5a and 5b of the hinge member 5 turn by 180°, respectively, with respect to the hinge member 5.

FIGS. 4(a) and 4(b) are cross-sectional views of a first embodiment of a switching mechanism of this invention for changing the orientation of the liquid crystal display, in which FIG. 4(a) shows a status of the switch turned off and FIG. 4(b) shows a status of the switch turned on. The switching mechanism can be provided, for example, on the hinge shaft 5a between the liquid crystal display 3 and the hinge member 5.

The switching mechanism 10 comprises a body 20 rigidly attached to the side of the liquid crystal display 3, a rotary portion fixed to the side of the hinge member 5 and a sliding member movable in the axial direction in response to the rotation of the rotary portion. The rotary portion comprises a shaft 11 fixed to the hinge member 5, a cam 12 fixed to the tip of the shaft 11 and a flange 13 which allow the cam 12 to move in the rotational direction, but prevent the movement thereof in the axial direction. The slide portion comprises a cam follower or receiver 14 which contacts the cam 12, a guide plate 15 fixed to the cam receiver 14 to allow the cam follower to move in the axial direction but to prevent the rotation thereof, and a shaft 16 fixed to the cam follower 14. The guide plate 15 is offset from the shaft 16 to prevent interference therewith.

The body 20 comprises a bearing 21 rotatably supporting the shaft 11, an annular guide grooves 22 rotatably guiding the, flange 13 but preventing axial movement thereof, axial guide grooves 23, which axially guide the guide plate 15 but prevent the rotational movement thereof, a bearing 24 supporting the shaft 16 to allow axial movement thereof, and a switch element 25 which functions as a switch when it comes into contact with the shaft 16. Also, there is a spring 26 provided along the shaft 16 between the wall of the bearing 24 and the cam follower 14 to keep the cam follower 14 always in contact with the cam 12.

As mentioned above, while the liquid crystal display 3 is turned by substantially 360° with respect to the apparatus body from the closed position, the respective pivot shafts 5a and 5b are turned by 180°, respectively. The cam 12 and the cam follower 14 have inclined surfaces or spiral surfaces mutually contacting each other. Therefore, during this operation, the cam 12 is turned by 180° with respect to the cam follower 14. Since the rotation of the cam follower 14 is prevented, the cam follower 14 is pushed in the axial direction by the cam 12 and axially moved in the direction of arrow B. When the cam 12 is rotated by a predetermined angle near to 180°, the end of the shaft 16 comes into contact with the switch element 25 and the switch is turned on, as shown in FIG. 4(b). When the liquid crystal display 3 is returned to its original position with respect to the apparatus body 1, for example the position as shown in FIG. 1, the switch is turned off.

It is possible that the switching mechanism 10 is attached to the pivot shaft 5b of the apparatus body 1 side, in place of the pivot shaft 5a of the liquid crystal display 3 side. It is also possible that the apparatus body 1 of the switching mechanism 10 and the rotatable portion (cam 12) are arranged in reverse. For instance, the apparatus body 20 may be provided in the hinge member 5 and the rotatable portion (cam 12) may be provided in the hinge member 5.

It is possible to regulate the rotational torques of the respective pivot shafts 5a and 5b in such a manner that, when the liquid crystal display panel 3 is turned by 360° with respect to the hinge member 5, one of the two pivot shafts 5a and 5b is first turned by 180° and the other thereof (in which this switching means is incorporated) is then turned by 180°, and when it is turned oppositely, the other is first turned and the one is then turned.

Figure 6A:
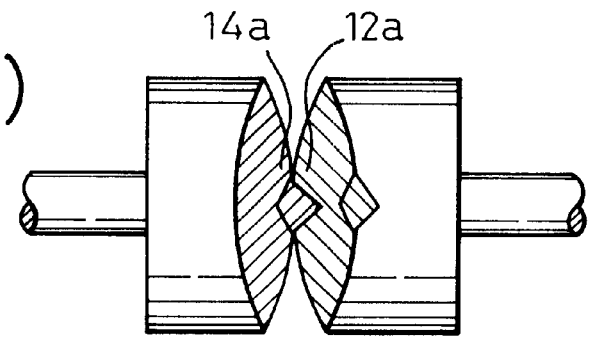
FIGS. 6(*a*) and 6(*b*) show a modified embodiment of the cam and cam follower shown in FIGS. 4(*a*) and 4(*b*) and the operation thereof, respectively.

FIG. 6(a) shows a modified embodiment of the cam 12 and the cam follower 14. In the same manner as the previous embodiment, an inclined or spiral surface is provided on the contact surface between the cam 12 and the cam follower 14. In this modified embodiment, one of the cam 12 and the cam follower 14 is provided with a concave surface 12a and the other is provided with a corresponding convex surface 14a in such a manner that, after the end of the shaft 16 once comes into contact with a switching element 25, the concave surface 12a and the convex surface 14a are engaged with each other so that the end of the shaft 16 comes away from the switching element 25.

Figure 6B:
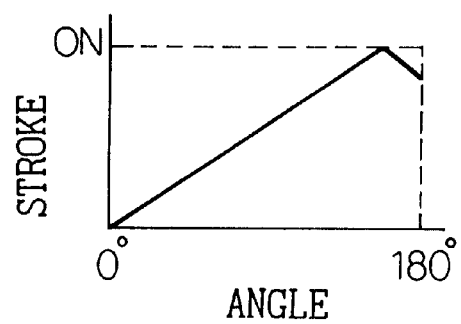

FIG. 6(b) shows the relationship between the angle of rotation of the cam 12 with respect to the switch body 10 and the stroke of the shaft 16. However, even if the end of the shaft 16 moves away from the switching element 25 after the end of the shaft 16 once comes into contact with the switching element 25, the switching element 25 is kept in the on state. If an opposite operation is effected, the concave surface 12a of the cam 12 and convex surface 14a of the cam follower 14 move with each other, the end of the shaft 16 upon coming into contact with the switching element 25 turns off the switching element 25 and thereafter moves away from the switching element 25. In this case, even if the shaft 16 moves away from the shaft 16 after it comes into contact therewith, the switching element 25 is kept in the off state.

When the switching element 25 is in the state OFF, the display of the liquid crystal 3 is positioned as shown in FIG. 1. Therefore, it is preferable for the operator to operate the keyboard with his fingers while watching the liquid crystal display 3. On the other hand, the switching element 10 is in the state ON, the display of the liquid crystal 3 is positioned as shown in FIG. 2. Therefore, it is preferable to operate the liquid crystal display panel 3 as a touch panel with a pen or the like. In FIG. 2, the liquid crystal display 3 is positioned on the back side of the keyboard 2.

FIG. 7 is a flow-chart showing an operation of the above-mentioned embodiment. First, the main power of this apparatus is turned ON (step 101) and the state of the display changing switch 10 is checked (step 102). When the switch is in a contact state (step 103), a display changing signal is supplied (step 104), the display of the liquid crystal 3 is turned by 90° (step 105), the other processes are carried out (step 106) and then the process is returned to step 102. When the switch is not in the contact state, the display of the liquid crystal 3 is kept as the initial state (step 107), the other processes are carried out (step 106) and then the process is returned to step 102.

Figure 8:
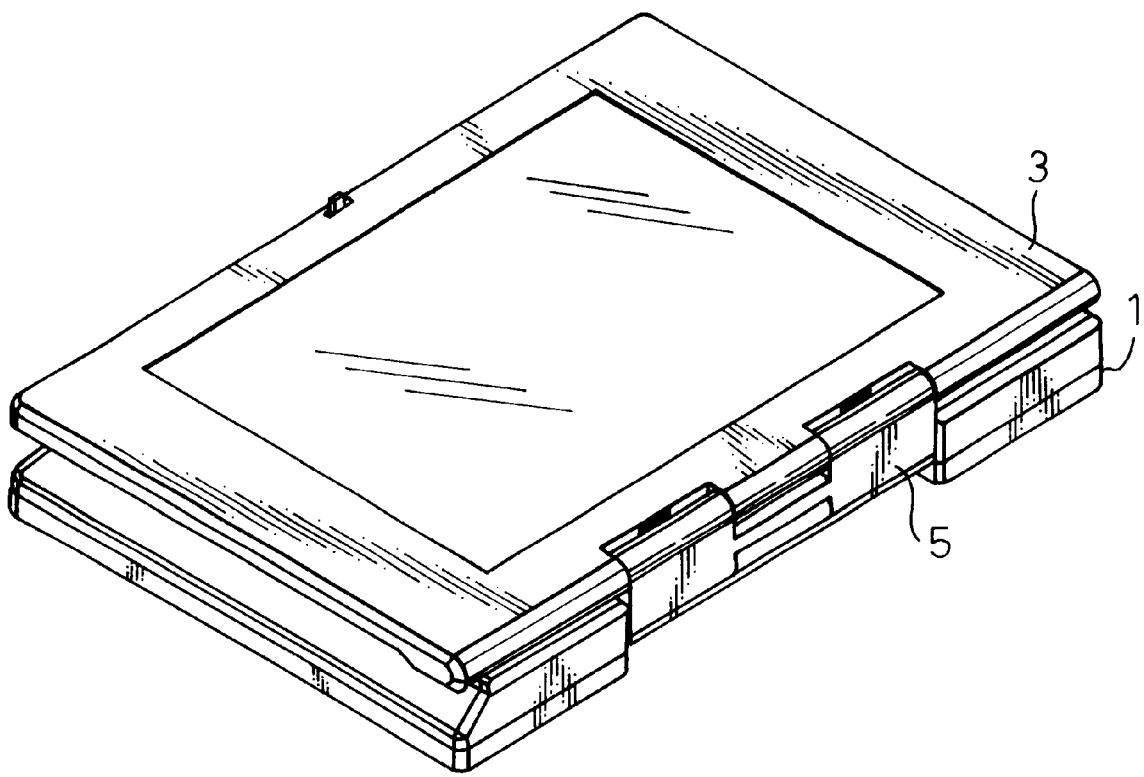
FIG. 8 is a perspective view of a second embodiment of the apparatus of this invention with the liquid crystal display being in an opened position by a 360° rotation with respect to a closed position thereof relatively the apparatus body.
Figure 9A:
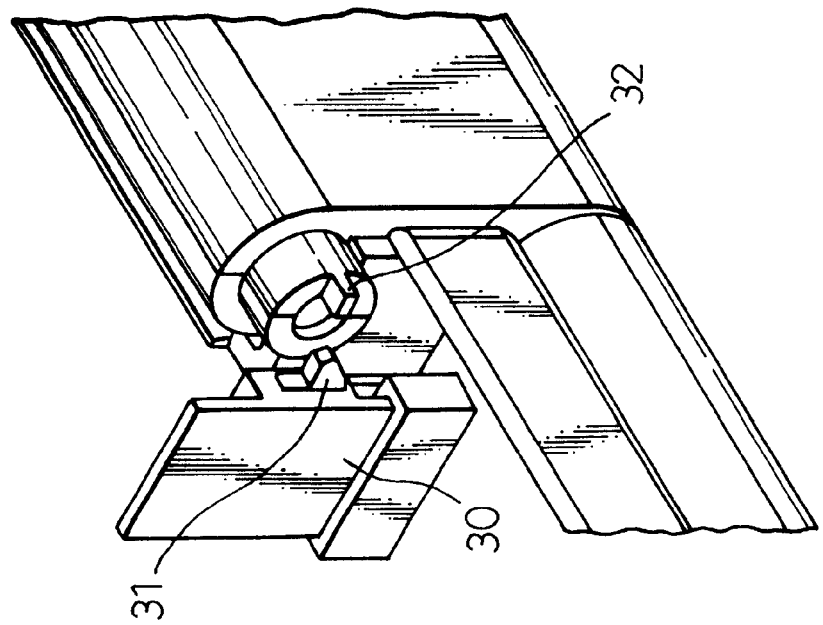
FIGS. 9(*a*) and 9(*b*) are a perspective view of the second embodiment with the liquid crystal display relatively to the body and an enlarged perspective view of a portion indicated by circle C in FIG. 9(*a*), respectively.
Figure 9B:
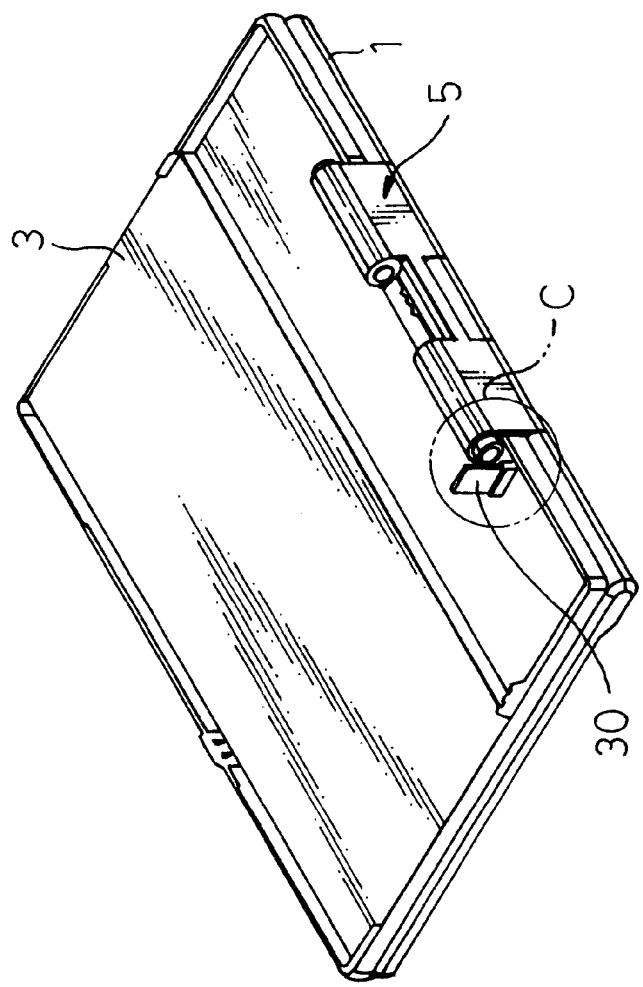
Figure 10:
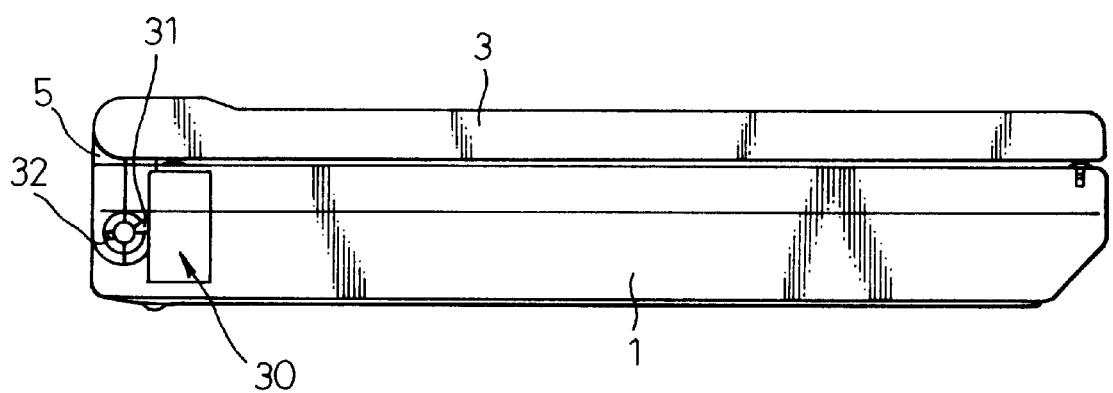
FIG. 10 is a side view of the second embodiment, with the liquid crystal display closed.

A second embodiment of a small-sized portable information processing apparatus of this invention will now be described with reference to FIGS. 8 through 15. FIG. 8 shows a state of the second embodiment with the liquid crystal display panel being opened by approximately 360° with respect to the apparatus body and FIGS. 9(a), 9(b) and FIG. 10 show the embodiment with the liquid crystal display panel being closed. FIG. 9(b) is an enlarged perspective view of a portion indicated by C in FIG. 9(a).

As shown in FIGS. 9(a) and 9(b), the liquid crystal display panel 3 is provided with a sensor switch 30 at a position near to the hinge member 5 on the back side thereof. On the other hand, the hinge member 5, i.e., a rotatable side, is provided with a projection 32 which interfere with a movement path of a contact 31 of the sensor switch 30.

As shown in FIGS. 9(a), 9(b) and FIG. 10, when the liquid crystal display panel 3 is in a closed position with respect to the apparatus body 1, the relationship between the contact 31 of the sensor switch 30 and the projection 32 of the hinge member 5 are apart from each other, by nearly 180°, the projection 32 of the hinge member 5 does not interfere with the contact 31 of the sensor switch 30 and therefore the switch is in OFF state.

Figure 12:
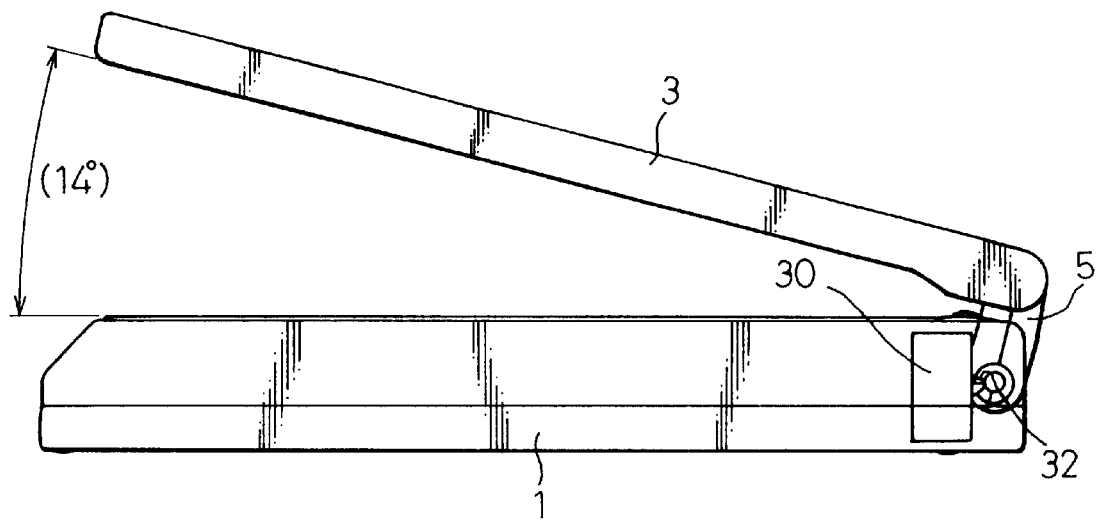
FIG. 12 is a side view of FIG. 11.

FIGS. 11(a) and 11(b) correspond to FIGS. 9(a) and 9(b), respectively, and FIG. 12 corresponds to FIG. 10. In this state, the liquid crystal display panel 3 is turned with respect to the apparatus body 1 from the position shown in FIGS. 9(a), 9(b) and 10 by 346° (the angle between the apparatus body 1 and the liquid crystal display panel 3 is 14°). In this state, the relationship between the contact 31 of the sensor switch 30 and the projection 32 of the hinge member 5 is a turned state by nearly 180° from the position of FIGS. 9(a), 9(b) and 10, the projection 32 comes into touch with the contact 31 of the sensor switch 30 and therefore the switch is in ON state.

Figure 13:
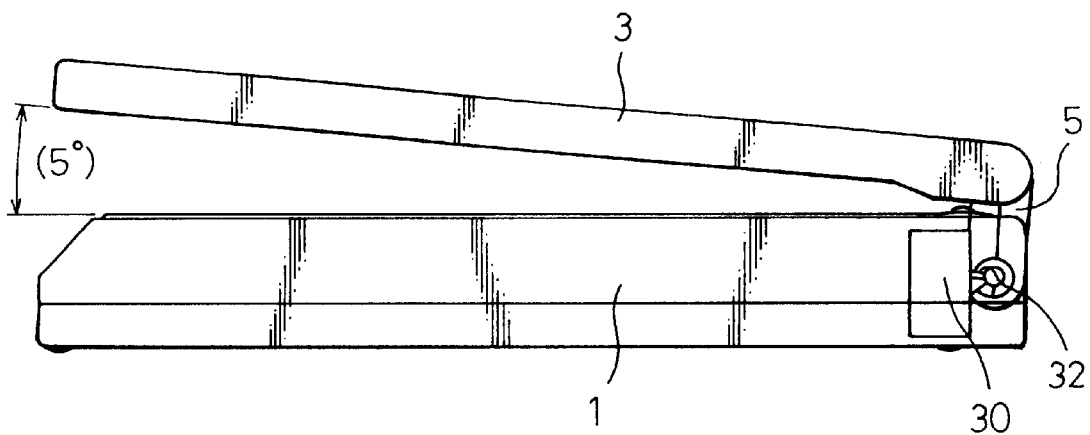
FIG. 13 is a side view of FIG. 11 in which the angle of the liquid crystal display is further changed from the state of FIG. 12.
Figure 14:
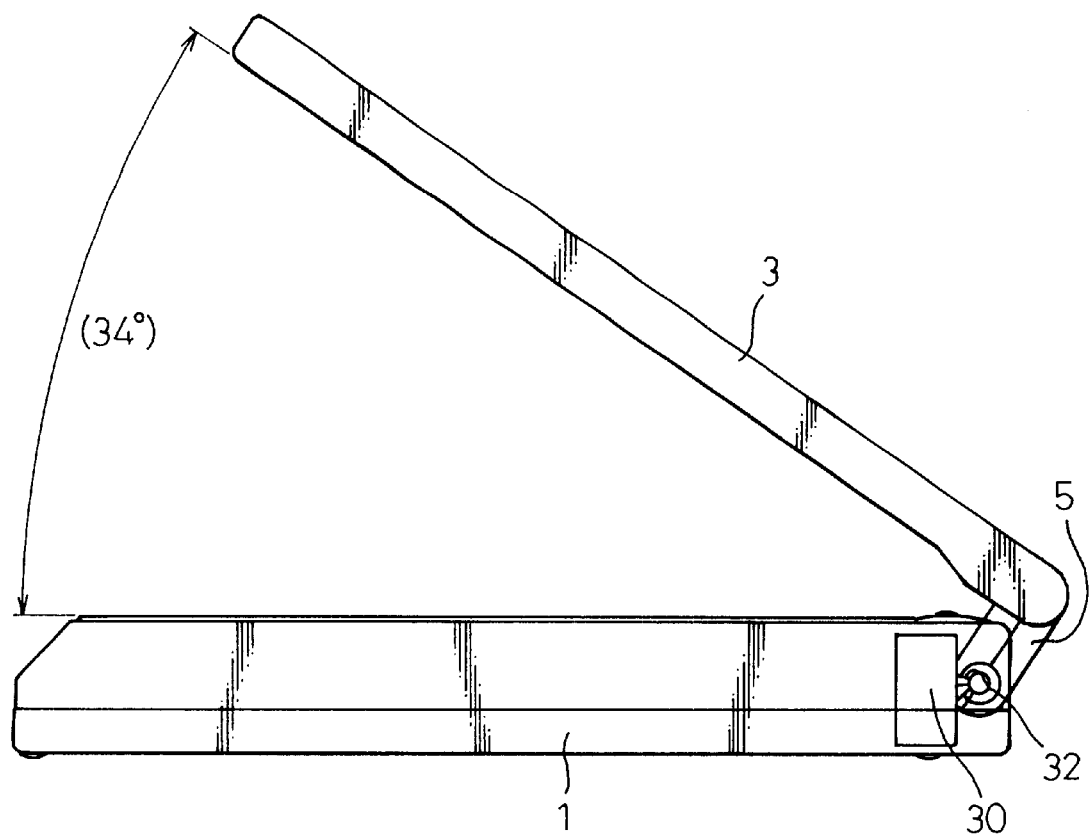
FIG. 14 is a side view in which the angle of the liquid crystal display is still further changed from the state of FIG. 13.

The angle of the liquid crystal display panel 3, with respect to the apparatus body 1, at which the sensor switch 30 performs the ON-OFF changing action, can be suitably selected by changing the position of the projection 32. For example, FIG. 13 shows a case in which the ON-OFF changing action is performed at a position of the liquid crystal display 3 which is turned by 355° with respect to the apparatus body 1 from the state shown in FIGS. 11(a), 11(b) and 12. Also, FIG. 14 shows another case in which the projection 32 comes into touch with the contact 31 of the sensor switch 30 to perform the switch ON-OFF changing action at a position of the liquid crystal display panel 3 which is turned by 35° with respect to the apparatus body 1 from the state shown in FIGS. 11(a), 11(b) and 12.

In the same manner as the first embodiment, the sensor switch 30 and the projection 32 can be provided on the apparatus body 1 and the hinge member 5, respectively. It is also possible that the sensor switch 30 is provided on the hinge member 5 and the projection 32 is provided on liquid crystal display panel 3 or the apparatus body 1. 5 For example, when the sensor switch 30 is in the state ON, a keyboard lock is effected (i.e., is active), and on the contrary when the sensor switch 30 is in the state OFF, the keyboard is unlocked. If the keyboard lock is to be effected, all of the keys may be made unoperable or only a part of the keys may be made unoperable.

Also, instead of the keyboard lock being effected, any actions to the apparatus can be ignored. For example, all or part of the inputs by the pen or keyboard can be ignored, the presentation on the display can be fully or partially invalidated, or any other actions can be made ineffectual.

Figure 15:
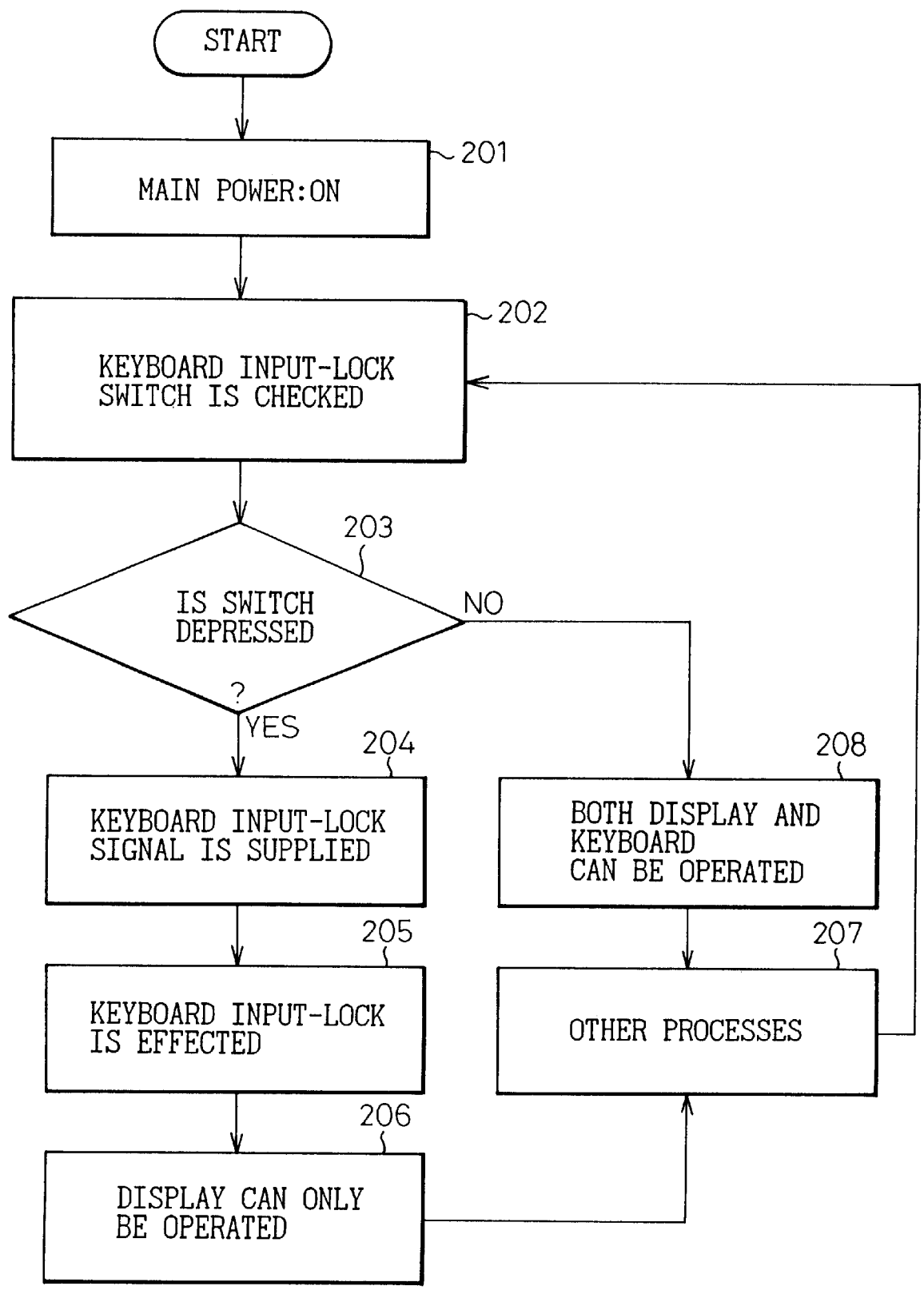
FIG. 15 is a flow-chart showing an operation of the second embodiment.
Figure 16A:
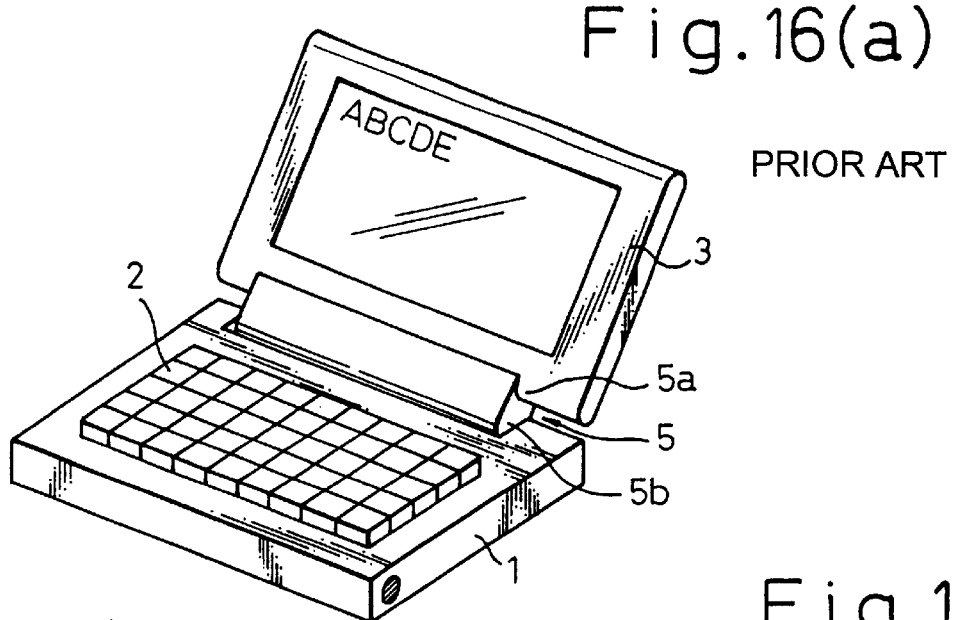
FIGS. 16(*a*) and 16(*b*) are perspective views showing a portable apparatus known in the prior art with the liquid crystal display in opened and closed positions, respectively.
Figure 16B:
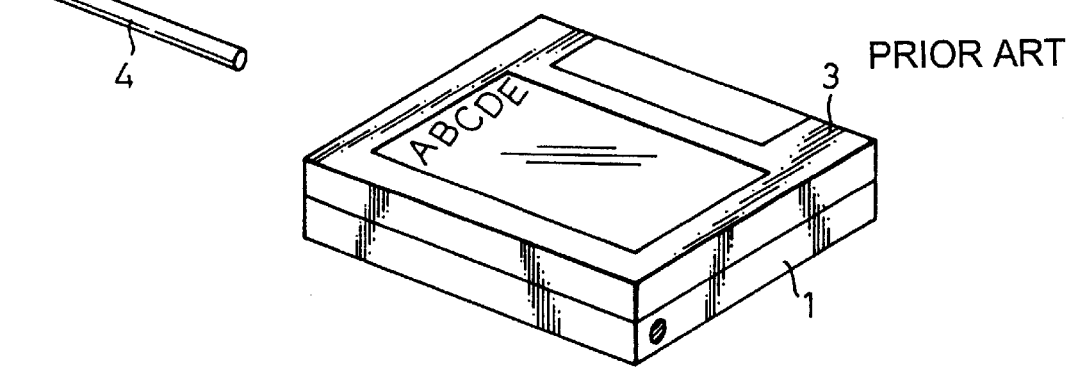
Figure 17A:
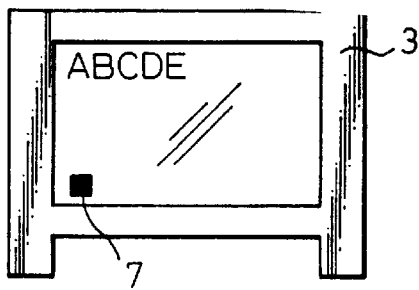
FIGS. 17(*a*) and 17(*b*) show a states of the known apparatus in which the liquid crystal display in FIG. 17(*b*) is turned by 90°, from that in FIG. 17(*a*).
Figure 17B:
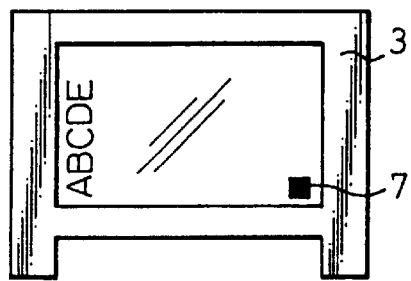

FIG. 15 is a flow-chart showing an operation of the second embodiment. First, the main power (not shown) of this apparatus is turned ON (step 201) and the state of the keyboard input lock switch 10 is checked (step 202). When the switch is in a contact state (step 203), a keyboard input lock signal is supplied (step 204), the keyboard input lock is effected (step 205) so that an input operation can only be performed on the display (step 206), the other processes are carried out (step 207) and then the process is returned to step 202. When the switch is not in the contact state, the keyboard input lock is not effected (step 205) so that an input operation can be performed both by the keyboard and the display (step 208), the other processes are carried out (step 207) and then the process is returned to step 202.

It should be understood by those skilled in the art that the foregoing description relates to only some preferred embodiments of the disclosed invention, and that various changes and modifications may be made to the invention without departing from the spirit and scope thereof.

What is claimed is:

1. An information processing apparatus, comprising:
   a body;
   a display panel attached to said body and rotatably movable through an angle of up to substantially 360° relatively to said apparatus body, said display panel having plural individually selectable data display orientations;
   a detector detecting at least a predetermined size of the angle between said apparatus body and said display panel; and
   a display orientation selector selecting a corresponding one of said data display orientations in accordance with the size of the angle detected by the detector, in such a manner that the data display orientation is changed automatically by approximately 90° when the display panel is rotated by approximately 360° with respect to the base.

2. An information processing apparatus according to claim 1, wherein said body further comprises an input unit.

3. An information processing apparatus according to claim 2, further comprising:
   a disabling unit selectively disabling operation of said input unit in accordance with said detector detecting an angle of a prescribed size between said display panel and said body.

4. An information processing apparatus according to claim 2, wherein said input unit is a keyboard.

5. An information processing apparatus according to claim 1, wherein said display panel further comprises a touch sensitive input unit.

6. The information processing apparatus according to claim 5, further comprising:

a disabling unit disabling operation of said touch sensitive input unit in accordance with said detector detecting the angle.

7. An information processing apparatus according to claim 6, further comprising:
a disabling unit selectively disabling operation of said touch sensitive input unit of said body in accordance with said detector detecting the angle between said display panel and said body.

8. An information processing apparatus according to claim 7, wherein said touch sensitive input unit is enabled for inputting information at least when the operation of said input unit of said body is disabled.

9. An information processing apparatus according to claim 1, further comprising a hinge comprising a first shaft connected to said body and a second shaft connected to said display panel, said hinge allowing the display panel to rotate relatively to the body through an angle of up to substantially 360°.

10. An information processing apparatus according to claim 1, wherein said display panel displays at least letters and images and is touch responsive for inputting information.

11. An information processing apparatus according to claim 1, wherein:
said display panel is rotatable through an angle of up to substantially 360° relatively to said body by means of a pivot shaft provided therebetween; and
said detector comprises a switching mechanism performing an ON-OFF operation in accordance with respective, different angles between said display panel and said apparatus body, produced by relative rotation thereof about said pivot shaft.

12. An information processing apparatus accordingly to claim 11, wherein said switching mechanism performs the ON-OFF operation thereof in response to rotation of said display panel through an angle of substantially 360° from a closed position thereof with respect to said body.

13. An information processing apparatus according to claim 11, wherein said switching mechanism comprises a cam on one of two members respectively connected to the body and the display panel and which rotate therewith, and relatively to each other, about said pivot shaft and a cam follower positioned on the other member so as to always be in contact with said cam and so as to be axially moved in accordance with rotation of said cam relatively to the cam follower, said switching mechanism performing the ON-OFF operation thereof in accordance with the axial movement of said cam follower.

14. An information processing apparatus according to claim 11, wherein said switching mechanism comprises a switching element, a cam provided on one of two members respectively connected to the body and the display panel and which rotate therewith, and relatively to each other, about said pivot shaft and a cam follower positioned on the other member so as to always be in contact with said cam and so as to be axially moved in accordance with rotation of said cam relatively to the cam follower, one of said cam and said cam follower having a concave surface and the other having a convex surface, so that relative rotation between said cam and said cam follower in a first direction causes, said cam follower to move in a first sense in the axial direction and come into contact with said switching element and an opposite direction of relative rotation between said cam and said cam follower causes said cam follower to move in the opposite sense in the axial direction, causing said cam follower to move away from said switching element.

15. An information processing apparatus according to claim 11, wherein said switching mechanism comprises a projection on one of two members, respectively connected to the body and the display panel and which rotate relatively to each other about said pivot shaft, and a sensor switch on the other member, so as to perform an ON-OFF operation of said sensor switch in accordance with the rotational movement of said projection.

16. An information processing apparatus according to claim 15, wherein said sensor switch magnetically detects a position in the rotational movement of said display panel with respect to said apparatus body.

17. An information processing apparatus according to claim 15, wherein said sensor switch optically detects a position in the rotational movement of said display panel with respect to said apparatus body.

18. An information processing apparatus according to claim 1, wherein said display panel has a substantially rectangular shape, longer sides thereof being parallel to an axis around which said display panel is rotatable with respect to said apparatus body.

19. An information processing apparatus according to claim 18, wherein the display panel has a further axis disposed centrally of and perpendicular to a plane of the substantially rectangular shape and the change of the data display orientation on the display panel comprises a rotation about the further axis by approximately 90° from a first position in which top and bottom edges of the display are parallel to, to a second position in which the top and bottom edges of the display are perpendicular to, the long edges of the rectangular shape.

20. An information processing apparatus according to claim 18, wherein the data display has selectable orientations parallel to and perpendicular to the longer sides of the substantially rectangular shape of the display panel and the data display orientation is changed therebetween when the display panel is rotated by approximately 360° with respect to the base.

21. An information processing apparatus comprising:
a body having a keyboard;
a display panel attached to said body and rotatably movable through an angle of up to 360°, encompassing plural selectable data display orientations of said display panel, relatively to said body;
a touch sensitive input unit;
a detector detecting at least a predetermined size of the angle between said apparatus body and said display panel; and
a disabling unit disabling operation of said touch sensitive input unit in accordance with said detector detecting the angle, in such a manner that the operation of said keyboard is disabled and the data display orientation is changed by approximately 90° when the display panel is rotated by substantially approximately 360° with respect to the body.

22. An information processing apparatus according to said claim 21, wherein input to said touch sensitive input unit is performed by a pen.

23. An information processing apparatus according to claim 21, wherein said touch sensitive input unit is disposed at said display panel.

24. An information processing apparatus according to claim 21, further comprising a hinge comprising a first shaft connected to said body and a second shaft connected to said display panel, said hinge allowing the display panel to rotate relatively to the body through an angle of up to substantially 360°.

25. An information processing apparatus according to claim 21, wherein said display panel displays at least letters and images and is touch sensitive for inputting information.

26. An information processing apparatus according to claim 21, wherein said display panel has a substantially rectangular shape, longer sides thereof being parallel to an axis around which said display panel is rotatable with respect to said apparatus body.

27. An information processing apparatus according to claim 26, wherein the display panel has a further axis disposed centrally of and perpendicular to a plane of the substantially rectangular shape and the change of the data display orientation on the display panel comprises a rotation about the further axis by approximately 90° from a first position in which top and bottom edges of the display are parallel to, to a second position in which the top and bottom edges of the display are perpendicular to, the long edges of the rectangular shape.

28. An information processing apparatus according to claim 26, wherein the data display has selectable orientations parallel to and perpendicular to the longer sides of the substantially rectangular shape of the display panel and the data display orientation is changed therebetween when the display panel is rotated by approximately 360° with respect to the base.

* * * * *